US011230054B1

(12) United States Patent
Church (10) Patent No.: US 11,230,054 B1
(45) Date of Patent: Jan. 25, 2022

(54) ACTIVE VALVE FOR MIXING AND DISPENSING CONTROL

(71) Applicant: nScrypt, Inc., Orlando, FL (US)

(72) Inventor: Kenneth H. Church, Orlando, FL (US)

(73) Assignee: nScrypt, Inc., Orlando, FL (US)

( * ) Notice: Subject to any disclaimer, the term of this patent is extended or adjusted under 35 U.S.C. 154(b) by 253 days.

(21) Appl. No.: 16/252,259

(22) Filed: Jan. 18, 2019

Related U.S. Application Data

(60) Provisional application No. 62/620,606, filed on Jan. 23, 2018.

(51) Int. Cl.
| | | |
|---|---|---|
| *B29C 64/165* | (2017.01) | |
| *B29C 64/171* | (2017.01) | |
| *B29C 48/16* | (2019.01) | |
| *B29C 48/25* | (2019.01) | |
| *B29C 48/30* | (2019.01) | |

(Continued)

(52) U.S. Cl.
CPC ............ *B29C 64/165* (2017.08); *B29C 48/16* (2019.02); *B29C 48/2511* (2019.02); *B29C 48/2692* (2019.02); *B29C 48/3003* (2019.02); *B29C 48/304* (2019.02); *B29C 48/92* (2019.02); *B29C 64/171* (2017.08); *B29C 64/209* (2017.08); *B29C 48/2552* (2019.02); *B29C 48/36* (2019.02); *B29C 48/361* (2019.02); *B29C 48/362* (2019.02); *B29C 48/363* (2019.02); *B29C 48/365* (2019.02); *B29C 64/00* (2017.08); *B29C 64/10* (2017.08); *B29C 64/106* (2017.08); *B29C 64/20* (2017.08); *B29C 64/30* (2017.08); *B29C 64/314* (2017.08); *B29C 64/336* (2017.08); *B29C 64/393* (2017.08);

(Continued)

(58) Field of Classification Search
CPC ....... B29C 64/00; B29C 64/10; B29C 64/106; B29C 64/165; B29C 64/20; B29C 64/209; B29C 64/30; B29C 64/314; B29C 64/336; B29C 64/393; B29C 48/2511; B29C 48/92; B29C 48/16; B29C 48/2692; B29C 48/3003; B29C 48/304; B29C 48/2552; B29C 48/36; B29C 48/361; B29C 48/362; B29C 48/363; B29C 48/365; B29C 2948/926
USPC .......................................... 425/375; 264/241
See application file for complete search history.

(56) References Cited

U.S. PATENT DOCUMENTS

| | | | |
|---|---|---|---|
| 6,986,739 B2 * | 1/2006 | Warren ................ | A61B 5/0066 600/159 |
| 2017/0120513 A1 * | 5/2017 | Brennan ................ | B28B 1/001 |

(Continued)

*Primary Examiner* — Joseph S Del Sole
*Assistant Examiner* — Lawrence D. Hohenbrink, Jr.
(74) *Attorney, Agent, or Firm* — Goodhue, Coleman & Owens, P.C.

(57) ABSTRACT

An assembly for performing an additive manufacturing process includes a first material feed for dispensing a first material, a second material feed for dispensing a second material, a material combiner chamber, a first entry channel fluidly connecting the first material feed and the material combiner chamber, and a second entry channel fluidly connecting the second material feed and the material combiner chamber. The assembly further includes a pen tip for dispensing a material in the additive manufacturing process, the material comprising the first material and the second material, a valve having a rod, a first seal between the material combiner and the pen tip, and a first actuator for moving the rod back and forth along a longitudinal axis to open and close the first seal.

22 Claims, 4 Drawing Sheets

(51) Int. Cl.
*B29C 48/92* (2019.01)
*B29C 64/209* (2017.01)
*B33Y 40/00* (2020.01)
*B29C 48/255* (2019.01)
*B33Y 10/00* (2015.01)
*B33Y 30/00* (2015.01)
*B29C 48/36* (2019.01)
*B29C 64/106* (2017.01)
*B29C 64/10* (2017.01)
*B29C 64/393* (2017.01)
*B29C 64/314* (2017.01)
*B29C 48/365* (2019.01)
*B29C 64/336* (2017.01)
*B29C 64/20* (2017.01)
*B29C 64/30* (2017.01)
*B29C 64/00* (2017.01)

(52) U.S. Cl.
CPC ......... *B29C 2948/926* (2019.02); *B33Y 10/00* (2014.12); *B33Y 30/00* (2014.12); *B33Y 40/00* (2014.12)

(56) References Cited

U.S. PATENT DOCUMENTS

2017/0165920 A1* 6/2017 Leavitt .................... B33Y 70/00
2018/0133670 A1* 5/2018 Lewis ...................... B41J 2/211
2019/0039299 A1* 2/2019 Busbee ................ B29C 64/112

* cited by examiner

ACTIVE VALVE FOR MIXING AND DISPENSING CONTROL

RELATED APPLICATIONS

This application claims priority to U.S. Provisional Patent Application No. 62/620,606, filed Jan. 23, 2018, hereby incorporated by reference in its entirety.

FIELD OF THE INVENTION

The present invention relates to additive manufacturing, direct digital manufacturing, and/or 3D printing. More particularly, but not exclusively, the present invention relates to an active valve for mixing and dispensing control.

BACKGROUND

Despite numerous advances in additive manufacturing, direct digital manufacturing, and 3D printing various problems remain. One set of problems relates to the ability to handle different types of materials. Materials may have wide ranging viscosity which has led to varying types of 3D printing systems based in part on the specific materials being used. Moreover, sometimes it is desirable to use particle loaded materials. It has been problematic to accommodate such a wide range of materials. Thus, conventionally multiple 3D printers are used or else potentially a single 3D may be re-configured for different materials such as through installation of different pumps. Neither solution allows for real-time or near-real time manufacturing.

Further problems relate to the inability for such systems to provide for clean starts and stops. In many implementations, a start may be accompanied by an undesired amount of extra material and a stop may also be accompanied with an undesired amount of extra material. The need to have clean starts and clean is critical in fine feature applications or higher resolution prints.

Therefore, what is needed is are new and improved devices and methods which address these problems.

SUMMARY

Therefore, it is a primary object, feature, or advantage of the present invention to improve over the state of the art.

It is a further object, feature, or advantage of the present invention to provide an additive manufacturing system with the ability to handle a wide range of materials from low viscosity to high viscosity.

It is a still further object, feature, or advantage of the present invention to provide an additive manufacturing system with the ability to handle particle loaded materials.

Another object, feature, or advantage is to provide for mixing and dispensing two or more materials that need to be mixed in real-time or near real-time.

Yet another object, feature, or advantage is to provide the ability to print (or dispense) gradient patterns in two and three dimensions.

Another object, feature, or advantage is to provide an additive manufacturing system which allows for clean starts and clean stops by starting and stopping the flow of material near a pen tip.

Another object, feature, or advantage is to provide for additive manufacturing methods which may be used in a broad range of fields including, but not limited to medical and biological fields.

Yet another object, feature, or advantage is to provide for additive manufacturing methods which allow for spinning a mixing rod.

A further object, feature, or advantage is to provide a system which allows for more ease and control during a 3D printing process.

A still further object, feature, or advantage is to remove the need to stop prints to switch out or remove a printed structured from a heated bed onto a different bed.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, an assembly for performing an additive manufacturing process is provided. The assembly includes a first material feed for dispensing a first material, a second material feed for dispensing a second material, a material combiner chamber, a first entry channel fluidly connecting the first material feed and the material combiner chamber, and a second entry channel fluidly connecting the second material feed and the material combiner chamber. The assembly further includes a pen tip for dispensing a material in the additive manufacturing process, the material comprising the first material and the second material, a valve having a rod, a first seal between the material combiner and the pen tip, and a first actuator for moving the rod back and forth along a longitudinal axis to open and close the first seal. The first material feed may feed a first material and the second material feed may feed a second material. The first material may chemically react with the second material when mixed within the material combiner chamber. The assembly may further include a flush port in the material combiner chamber for receiving a fluid for flushing the material combiner chamber. The assembly may further include a second actuator operatively connected to the rod for spinning the rod. The assembly may further include a controller operatively connected to the first actuator. The assembly may further include a first pressure sensor associated with the first material feed and a second pressure sensor associated with the second material feed, the first pressure sensor and the second pressure sensor both operatively connected to the controller for providing sensor data to the controller. The assembly may further include a first pressure valve associated with the first material feed and a second pressure valve associated with the second material feed, the first pressure valve and the second pressure valve both operatively connected to the controller. The material combiner chamber and/or the valve may be coated with a lubricious material or may be formed form a lubricious material and may be disposable. The assembly may further include a third actuator, the third actuator associated with the first material feed and a fourth actuator, the fourth actuator associated with the second material feed. The assembly may further include mixing structures on the rod such as paddles. Each of the various actuators may be motors.

According to another aspect, an assembly for performing an additive manufacturing process includes a controller, a first material feed for dispensing a first material, a second material feed for dispensing a second material, a material combiner chamber, a pen tip for dispensing a material in the additive manufacturing process, the material comprising the first material and the second material, a valve having a mixing rod, a first seal between the material combiner chamber and the pen tip, a first actuator, and a second actuator for rotating the mixing rod. The first actuator is configured to move the mixing rod and the second actuator back and forth along a longitudinal axis to open and close the first seal. The controller is operatively connected to the valve, the first actuator, and the second actuator. The assembly may further include a first pressure sensor associated with the first material feed, a second pressure sensor associated with the second material feed. Both the first pressure sensor and the second pressure sensor may be operatively connected to the controller for providing sensor data to the controller. The assembly may further include a first pressure valve associated with the first material feed and a second pressure valve associated with the second material feed, the first pressure valve and the second pressure valve both operatively connected to the controller.

According to another aspect, a method of additive manufacturing includes steps of receiving a first material into a material combiner chamber, receiving a second material into the material combiner chamber, combining the first material and the second material in the material combiner chamber by rotating a mixing rod within the material combiner chamber, and opening and closing a seal associated with a pen tip by raising and lowering the mixing rod within the material combiner chamber to engage and disengage a seal.

According to another aspect, a system for performing an additive manufacturing process includes a controller, a first material feed for dispensing a first material, a second material feed for dispensing a second material, a material combiner chamber, a pen tip for dispensing a material in the additive manufacturing process, the material comprising the first material and the second material, a valve having a mixing rod, a first seal between the material combiner chamber and the pen tip, a first actuator, and a second actuator for rotating the mixing rod. The first actuator is configured to move the mixing rod and the second actuator back and forth along a longitudinal axis to open and close the first seal. A second actuator is operatively connected to the rod for spinning the rod. The control system is operatively connected to the first actuator, and the second actuator the control system measures current to drive the second actuator and determine viscosity of material within the material combiner chamber using the current. The control system may be further configured to determine volumetric flow rate and pressure.

According to another aspect, a method of monitoring viscosity in an additive manufacturing system is provided. The method includes monitoring current of an actuator used to stir one or more materials to be dispensed and determining viscosity using the current. The determining of viscosity may include determining changes in viscosity where such changes may be relative changes or absolute changes, or rate of change of viscosity.

DETAILED DESCRIPTION

In one embodiment, two or more materials that need to be mixed in real time or near real time can be mixed and then dispensed. Examples of such materials may include, without limitation, epoxies, polyurethanes, dyes in a material, biomaterials, electronic materials, and structural materials. This can also provide the ability to print (dispense) gradient patterns in two and three dimensions. This can be used to make 3D structures. Right now, materials need to harden before they will stack or hold rigid in 3D space, mixing two or more materials that quickly harden without clogging the nozzle has advantages in 3D printing. Here, apparatuses and methods are provided which provide the ability to handle a wide range of materials from low viscosity to high viscosity and also particle loaded materials. These materials may be mixed and dispensed with clean starts and stops, that is to say without extra material (blobs). These clean start/stops are critical for many fine feature applications or higher resolution prints.

According to one aspect, an assembly including a valve is provided. The valve includes a valve rod. The valve rod serves dual functions. First, the valve rod may be moved in and out to open and close a seal. Second, the valve rod may spin such that the valve also functions as a mixing rod.

Figure 1:
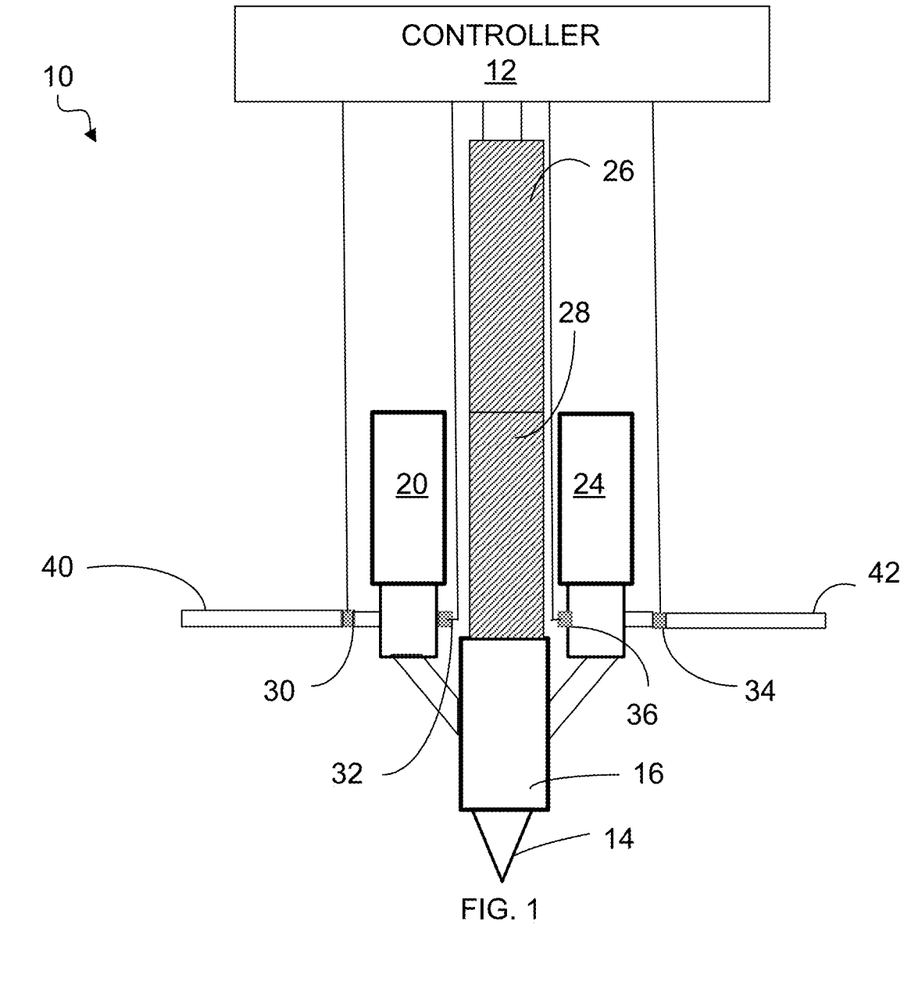
FIG. 1 illustrates one example of an apparatus.

FIG. 1 illustrates one embodiment of an additive manufacturing or 3D printing system 10. The 3D printing system 10 may be a direct-write deposition technology (DWDT) system with an active valve and pressure dispensing. A controller 12 is shown. A pen tip 14 is shown which is operatively connected to a material combiner chamber 16 which may be tubular in shape. The material combiner chamber 16 may also be referred to as a mixing chamber. A first material may feed through a first material feed 40 into the material combiner chamber 16. A second material may also be feed through a second material feed 42 into the material combiner chamber 16. The portions of the first material feed 40 and the second material feed 42 which fluidly connect the first material feed and the second material feed to the material combiner chamber 16 may be referred to as the first entry channel and the second entry channel. These connection points may also be referred to as ports. Although two material feed channels are shown, it to be understood that any number of additional feed channels may be present where additional materials are to be mixed and dispensed. Pressure sensors 30, 34 are associated with the first material feed 40 and the second material feed 42, respectively. The pressure sensors are operatively connected to the controller 12 so that the controller 12 receives pressure sensor data indicative of pressure. Pressure valves 32, 36 are also associated with each of the material feeds 40, 42. The pressure valves 32, 36 are also operatively connected to the controller 12 so that the controller can control pressure. The pressure valves 32, 36 on the material feeds 40, 42 add to pressure stabilization in real-time when starting and stopping. The motors 20, 24 may be used to drive an auger or progressive cavity pump system for moving material from the first material feed 40 and the second material feed 42 into the system. The material may be fed from a large syringe or bucket (not shown) that is fed using positive pressure. The positive pressure may be controlled with the controller 12. This may be air pressure on a syringe or barrel and piston or may be applicated using a mechanical press such as positive displacement.

The first motor 26, may be used to move the second motor 28 and a valve/mixing rod up and down. The second motor 28 may be operatively connected to the valve/mixing rod. The second motor 28 spins the rod. The spin rate may be controlled via the controller 12. As shown in FIG. 1, a controller 12 is used to receive feedback from a plurality of motors 20, 24, 26, 28, and pressure sensor data from pressure sensors 30, 34 associated with the material feed 40, 42. The controller 12 may be used to synchronously control the motors 20, 24, 26, 28, material feed 40, 42, and pressure valves 32, 36. The synchronous motion of spinning and the vertical movement of the valve may be optimized for each material.

Another port may be present on the mixing chamber 16 and may be used as a flush to send a solvent or a material that releases or eliminates the chemical reaction of the mixing to stop any hardening. This flush may occur as a cleaning step to prohibit material from setting up inside the mixing chamber 16. The valves and chamber 16 may be coated with a lubricious material such as Teflon. Alternatively, the valves and chamber 16 may formed from a lubricious material such as Teflon and be disposable after use. It should further be understood that the sizes of valves and the size of the chamber 16 may be varied so at to be small to accommodate very low dispensing volumes or to be larger for very high dispensing volumes.

In one embodiment, the mixing rod is connected to a motor and the current used to drive the motor is measured in real-time. As the material properties change and become viscous, the current and thus the torque required to spin the rod at a given speed will change. The current can be directly correlated to viscosity where an increase in viscosity produces an increase in current. Using current measurements from the mixing rod motion, an in situ rheometer is thus formed and may be used to ensure consistent results during the mixing process. Maintaining proper viscosity control leads to improved printing results by preventing too-low viscosity from causing 3D prints to slump and not build to the proper height and too-high viscosity from causing clogging and too-low flow which would cause gaps to form in 3D prints.

Indeed, measurement of all fluid dispensing properties is useful for optimizing printing settings for a wide variety of materials. In conventional 2D dispensing the exact print speed, line width, and layer height are less important than in 3D printing because in 3D printing the lines and layers must build and stack together. These properties are measured as follows. Viscosity changes occur as polymerization occurs in a given material at various flow rates and mixing speeds and when different materials are printed or chemistry is varied. As stated previously, viscosity can be measured using the mixing motor current. Pressure in the mixing chamber is caused by the viscous material being flowing through the mixer and being forced through the relatively smaller nozzle opening. Pressure can be measured using a fluid pressure transducer fluidly connected to the mixing chamber. Material volumetric flow rate is can be measured from material delivery cavity pumps which are fixed flow rate pumps. The material delivery pump motor velocities can be directly correlated with volumetric flow rate. Viscosity, pressure, and flow measurements in situ of the flow path allow inconsistencies and flaws in printing to be detected and accurately corrected. The real time data can be used to ensure consistent dispensing which yields higher quality, lower tolerance, less porous, more smooth, and stronger 3D parts.

Multi-part polymeric materials are designed to polymerize once mixed. The time required for complete polymerization to occur and the amount of mixing time and sheer forces are variables which must be controlled to yield quality prints. As polymerization occurs, viscosity and pressure increase and can be used as evidence of mixing. In situ mix checking can be achieved by measuring the viscosity of the material and the pressure in the mixing chamber and the amount of polymerization at various dispensing rates can be measured and correlations can be determined. An automatic controller such as controller 12 can use this data as feedback and adjust the dispensing parameters to optimize the mixing and dispensing system for the best quality prints.

Figure 2:
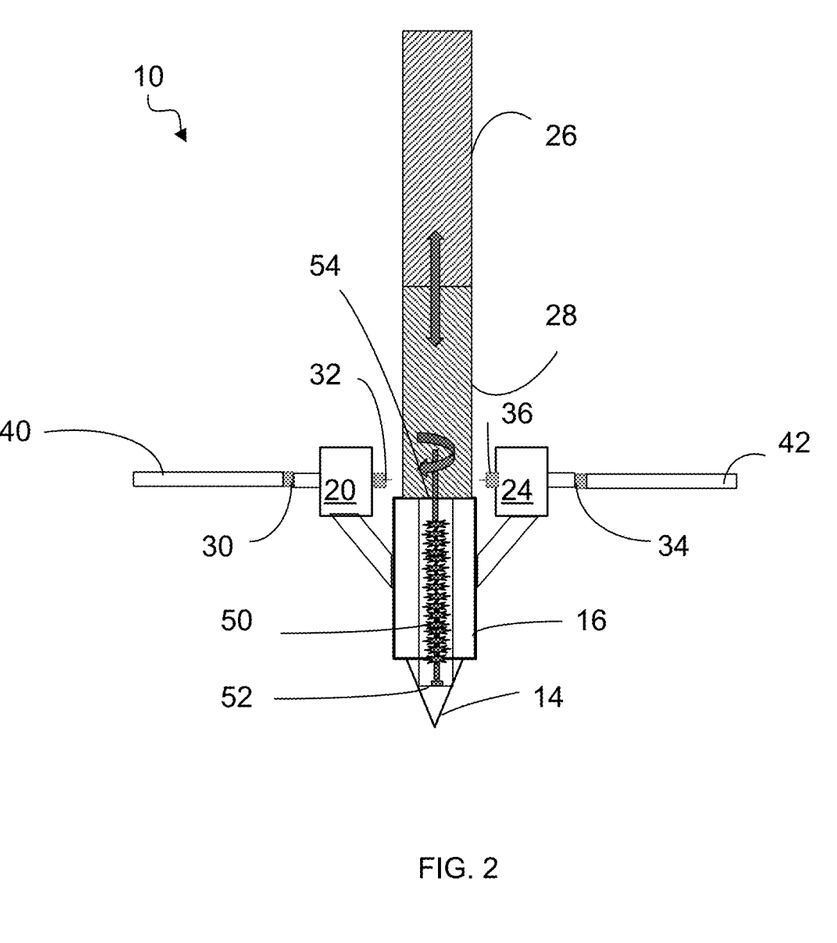
FIG. 2 illustrates the apparatus with a mixing rod/valve rod which rotates to provide active mixing.

FIG. 2 illustrates the system 10 showing the valve/mixing rod 50. The first motor 26, may be used to move the second motor 28 and the valve/mixing rod 50 up and down. The second motor 28 may be operatively connected to the valve/mixing rod 50. The second motor 28 spins the rod. The spin rate may be controlled via the controller. The rod 50 may be connected to the second motor 28 and may be mounted on a slide rail. The first motor 26 may provide motion along a longitudinal axis which may be a vertical axis. Thus, vertical motion may lift or lower the second motor 28 along with the valve/mixing rod 50. This allows for start and stop of the material near the pen tip 14. The pen tip 14 creates a seal 52 with the tube that material flows through in the chamber 16. The seal 52 can be opened and closed with the rod. Pulling back (pulling upward in the configuration shown) closes the seal and the further back it is pulled the more suck back. A second seal 54 at the top of the tube stops material flow and forces the material to exit through the pen tip only. The second seal 54 may be set to change the length of the mixing area in the tube of the chamber 16.

As shown, the material combiner chamber 16 has entry channels for a plurality of materials through the first material feed 40 and the second material feed 42. Although two are shown, it is to be understood that additional entry channels for different materials may be present. The material combiner chamber may be shaped like a tube. The tube may form a seal with the pen tip as previously explained. The mixing rod serves dual purposes, as both a mixer and as a valve rod to control material flow. The motion may be similar to that disclosed in U.S. Pat. No. 6,986,739, hereby incorporated by reference in its entirety. The motion can create a clean stop with the ability to suck back. Indeed, one of the advantages of the system 10 is that it provides for start and stop of the material at the pen tip 14.

When the valve rod 50 stops mixing and is pulled back, it may seal the tube-shaped chamber 16 and thus creates a pressure. The motors 20, 24 may be turned backward to relieve pressure, but the pressure valves 32, 36 may do this more quickly, as the pressure valves 32, 36 require only a small amount of movement to reduce pressure. When the values 32, 36 are turned on, they can be used to fill the material combiner chamber 16 quickly or in a controlled manner as needed.

The mixing speeds may vary from very slow such as 1 revolutions per minute to very fast such as thousands of revolutions per minute depending upon the mixing required for a particular application. The rods 50 may be of a design to facilitate mixing such as by including one or more paddles, blades, shafts, or other structures that assist in homogenization of the materials being mixed.

Figure 3:
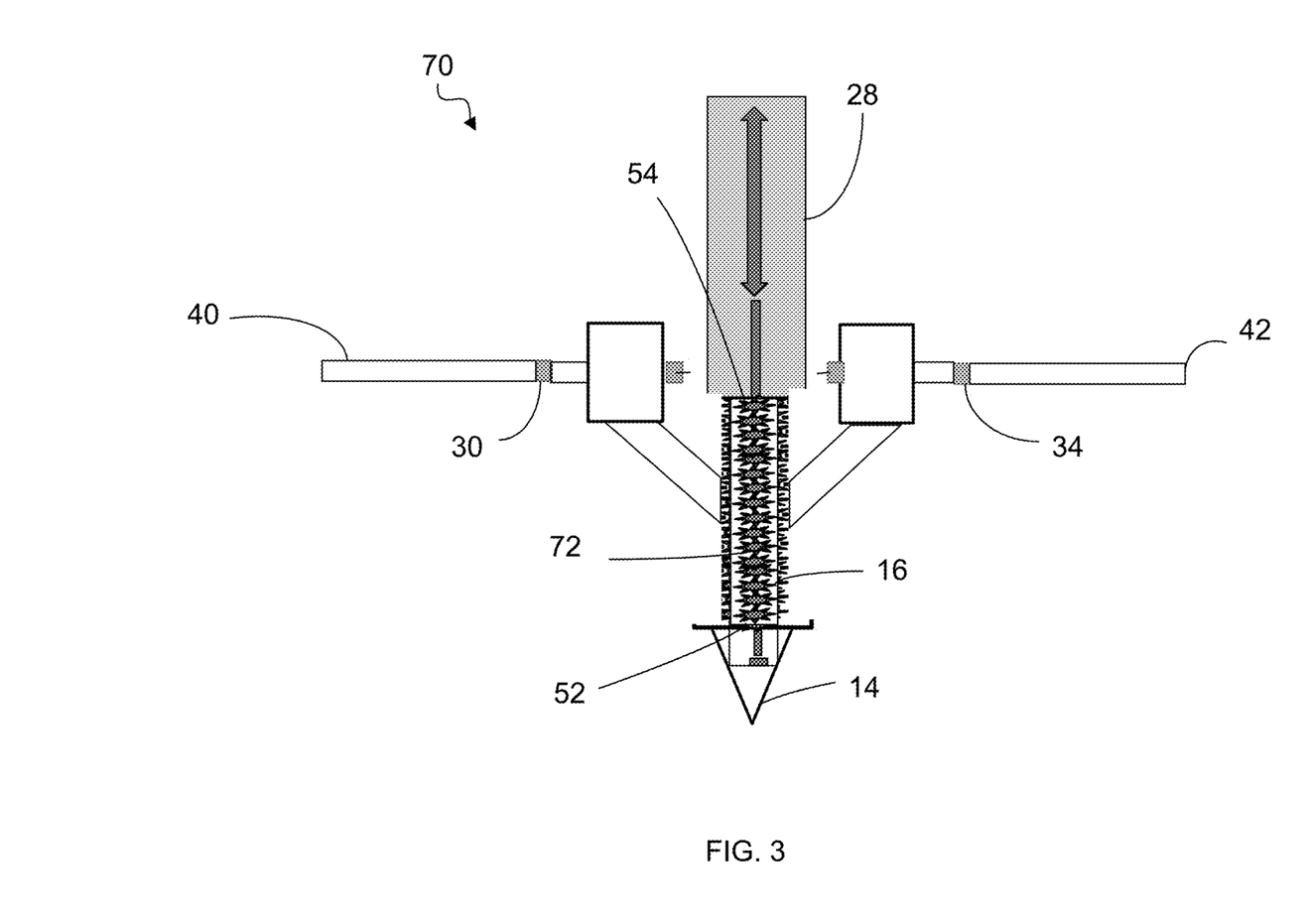
FIG. 3 illustrates an embodiment of the apparatus where passive mixing is performed

FIG. 3 illustrates an alternative embodiment of the system 70. In this embodiment, a passive mixing approach is used which eliminates the second motor and the active mixing valve rod is replaced with a passive mixing valve rod that does not spin. The shape of the valve rod 72 and the interior of the material chamber 16 are designed in such a way that the material as it passes through is continuously mixing because of the forced paths the material must flow into. The rod 72 in the center of the passive mixing tip allows for precise start/stop control.

The first motor 28 may provide vertical motion and lift or lower the assembly including the motor passive rod 72 which passively mixes. This provides start and stop of the material flow near the pen tip 14. The pen tip 14 creates a seal with the tube that material flows through. This seal can be opened and closed with the rod 72. Pulling back closes the seal and the further back it is pulled, the more suck back. Various types of materials may be used. For example, metals may be used where it is cleaned and re-used and plastic may be used where it is disposable.

Figure 4:
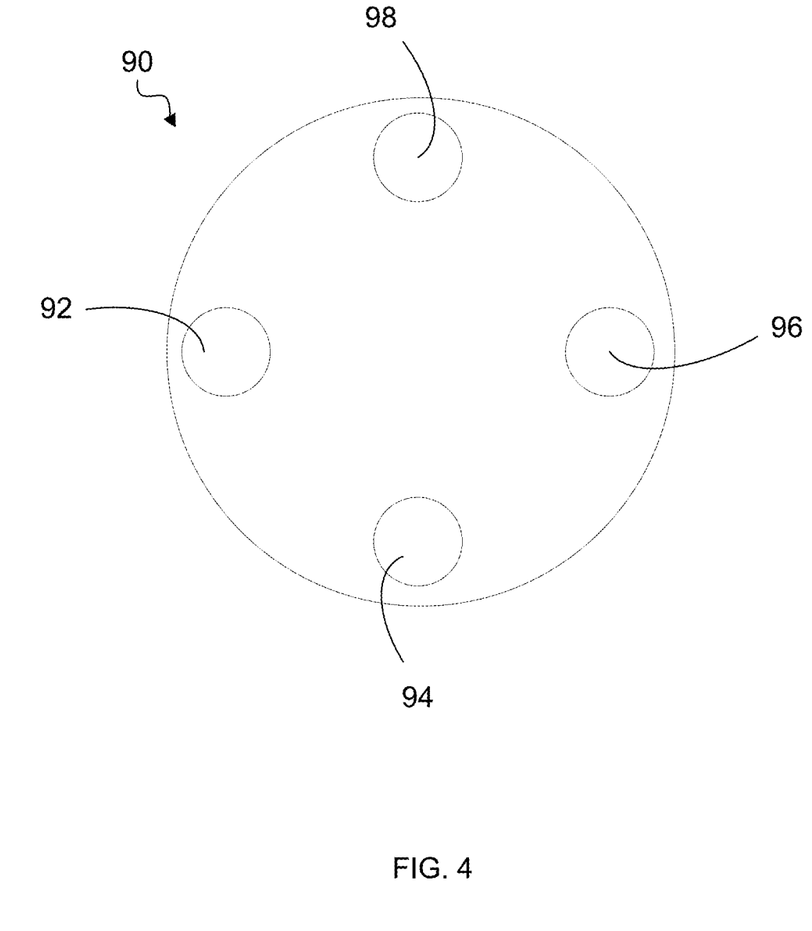
FIG. 4 illustrates a flush port and material feed ports.

FIG. 4 illustrates a top view of another example of a mixing chamber 90. The mixing chamber 90 may have a plurality of ports including ports associated with material feeds, such as ports 92, 94, 96. In addition, the mixing chamber 90 may have a flush port such as port 98. As previously explained the flush port 98 may be used to flush solvent or material that releases or eliminates the chemical reaction of the mixing to stop any hardening. Although a single flush port 98 is shown, it is to be understood that more than one flush port may be present. It is further to be understood that the fluid used for flushing may be dependent upon the materials being used.

The systems shown and described have utility in any number of different fields including but not limited to medical and biological fields and may be used to manufacture any number of different devices.

Therefore, various methods, systems, and apparatus have been shown and described. Although specific embodiments have been shown and discussed, it is to be understood that various elements of different embodiments may be combined and that numerous variations, options, and alternatives are contemplated. The present invention is not to be limited to the specific embodiments described herein.

What is claimed is:

1. An assembly for performing an additive manufacturing process, comprising:
   a first material feed for dispensing a first material;
   a second material feed for dispensing a second material;
   a material combiner chamber;
   a first entry channel fluidly connecting the first material feed and the material combiner chamber;
   a second entry channel fluidly connecting the second material feed and the material combiner chamber;
   a pen tip for dispensing a material in the additive manufacturing process, the material comprising the first material and the second material, the pen tip below the material combiner chamber and having an opening therein;
   a valve having a rod;
   a first seal on an end of the rod between the material combiner chamber and the pen tip;
   a second seal for the material combiner chamber positioned along the rod and above the first seal wherein a position of the second seal in the material combiner chamber and a position of the first seal in the material combiner chamber define a mixing area within the material combiner chamber, the mixing area between the first seal and the second seal;
   a first actuator for moving the rod back and forth along a longitudinal axis extending through the mixing area to open and close the first seal such that moving the rod sufficiently back along the longitudinal axis closes the first seal and moving the rod sufficiently forward along the longitudinal axis opens the first seal.

2. The assembly of claim 1 wherein the first material feed feeds the first material and wherein the second material feed feeds the second material, and wherein the first material chemically reacts with the second material when mixed within the material combiner chamber.

3. The assembly of claim 2 further comprising a flush port in the material combiner chamber for receiving a fluid for flushing the material combiner chamber.

4. The assembly of claim 1 further comprising a second actuator operatively connected to the rod for spinning the rod.

5. The assembly of claim 1 further comprising a third actuator, the third actuator associated with the first material feed and a fourth actuator, the fourth actuator associated with the second material feed.

6. The assembly of claim 1 further comprising a controller operatively connected to the first actuator.

7. The assembly of claim 1 further comprising a controller operatively connected to the first actuator and a second actuator wherein the controller monitors current associated with the second actuator and determines a viscosity of the material at least partially based on the current.

8. The assembly of claim 7 further comprising a first pressure sensor associated with the first material feed and a second pressure sensor associated with the second material feed, the first pressure sensor and the second pressure sensor both operatively connected to the controller for providing sensor data to the controller.

9. The assembly of claim 8 further comprising a first pressure valve associated with the first material feed and a second pressure valve associated with the second material feed, the first pressure valve and the second pressure valve both operatively connected to the controller.

10. The assembly of claim 1 wherein the material combiner chamber is coated with a lubricious material.

11. The assembly of claim 1 wherein the rod is coated with a lubricious material.

12. The assembly of claim 1 wherein the material combiner chamber is formed from a lubricious material.

13. The assembly of claim 1 wherein the rod is formed from a lubricious material.

14. The assembly of claim 1 further comprising mixing structures on the rod.

15. The assembly of claim 14 wherein the mixing structures comprise paddles.

16. The assembly of claim 1 wherein the first actuator is a motor.

17. The assembly of claim 1 wherein the first actuator is further configured for moving the rod sufficiently back along the longitudinal axis after closing the first seal to provide suck back of the material away from the outlet.

18. A system for performing an additive manufacturing process, comprising:
   a first material feed for dispensing a first material;
   a second material feed for dispensing a second material;
   a material combiner chamber;
   a pen tip having an outlet for dispensing a material in the additive manufacturing process, the material comprising the first material and the second material;
   a valve having a mixing rod and a first seal positioned at an end of the mixing rod between the material combiner chamber and the pen tip;
   a first actuator;
   a second actuator;
   wherein the first actuator is configured to move the mixing rod and the second actuator back and forth along a longitudinal axis to open and close the first seal such that the first seal is moved away from the pen tip to close the first seal and towards the pen tip to open the first seal;

the second actuator operatively connected to the mixing rod for spinning the mixing rod such that the mixing rod mixes the material;

a control system operatively connected to the first actuator, and the second actuator wherein the control system measures current to drive the second actuator and determines viscosity of material within the material combiner chamber using the current.

19. The system of claim 18 wherein the control system is further configured to determine volumetric flow rate.

20. The system of claim 18 wherein the control system is further configured to determine pressure.

21. The system of claim 18 wherein the first actuator is further configured for moving further away from the pen tip after the first seal is closed to provide suck back of the material away from the outlet.

22. A system for performing an additive manufacturing process, the system comprising:

a first material feed for dispensing a first material;

a second material feed for dispensing a second material;

a material combiner chamber;

a pen tip having an outlet for dispensing a material in the additive manufacturing process, the material comprising the first material and the second material;

a valve having a mixing rod and a first seal positioned at an end of the mixing rod between the material combiner chamber and the pen tip;

a first actuator;

a second actuator for rotating the mixing rod;

wherein the first actuator is configured to move the mixing rod and the second actuator back and forth along a longitudinal axis to open and close the first seal such that the actuator moves the mixing rod extends downwardly towards the pen tip to open the first seal and upwardly away from the pen tip to close the first seal;

a second actuator operatively connected to the mixing rod for spinning the mixing rod, and a control system operatively connected to the first actuator, and the second actuator wherein the control system measures current to drive the second actuator and determines viscosity of material within the material combiner chamber using the current.

* * * * *